(12) United States Patent
Kim

(10) Patent No.: US 12,276,313 B2
(45) Date of Patent: Apr. 15, 2025

(54) ELECTRO-MECHANICAL BRAKE

(71) Applicant: HYUNDAI MOBIS Co., Ltd., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 354 days.

(21) Appl. No.: 17/838,496

(22) Filed: Jun. 13, 2022

(65) Prior Publication Data

US 2022/0403902 A1    Dec. 22, 2022

(30) Foreign Application Priority Data

Jun. 16, 2021   (KR) .................. 10-2021-0077814

(51) Int. Cl.
| | |
|---|---|
| *F16D 66/02* | (2006.01) |
| *F16D 65/18* | (2006.01) |
| *F16D 66/00* | (2006.01) |
| *F16D 121/24* | (2012.01) |

(52) U.S. Cl.
CPC ........... *F16D 66/021* (2013.01); *F16D 65/18* (2013.01); *F16D 2066/003* (2013.01); *F16D 2066/006* (2013.01); *F16D 2121/24* (2013.01)

(58) Field of Classification Search
CPC ...... F16D 66/02; F16D 66/021; F16D 66/025; F16D 2066/003; F16D 2066/006; F16D 2121/24; F16D 65/18

See application file for complete search history.

(56) References Cited

U.S. PATENT DOCUMENTS

| | | | |
|---|---|---|---|
| 10,933,848 B2 * | 3/2021 | Bast | B60T 13/588 |
| 2005/0035653 A1 | 2/2005 | Godlewsky et al. | |
| 2017/0291585 A1 * | 10/2017 | Kobune | F16D 55/226 |
| 2018/0056951 A1 * | 3/2018 | Baehrle-Miller | B60T 13/145 |
| 2018/0154880 A1 * | 6/2018 | Wolff | B60T 13/741 |

(Continued)

FOREIGN PATENT DOCUMENTS

| | | |
|---|---|---|
| CN | 107107889 A | 8/2017 |
| CN | 110958963 A | 4/2020 |

(Continued)

OTHER PUBLICATIONS

Office Action issued on Jan. 3, 2025 in Chinese Patent Application No. 202210671575.0 with English translation.

*Primary Examiner* — Thomas J Williams
(74) *Attorney, Agent, or Firm* — Morgan, Lewis & Bockius LLP

(57) ABSTRACT

An electro-mechanical brake includes: a brake disc; a friction pad; a pressing unit configured to press the friction pad toward the brake disc; a motor supplying power to the pressing unit; a current sensor; a position sensor configured to measure a position of the pressing unit; and an initial position calculating unit calculating at least one of a home position or a contact point of the pressing unit, wherein the pressing unit is configured to pass through a first check point at which a first current is measured, and a second check point at which a second current greater than the first current is measured, and wherein the initial position calculating unit calculates at least one of the home position or the contact point based on the first current, the first check point, the second current, and the second check point.

11 Claims, 8 Drawing Sheets

(56) References Cited

U.S. PATENT DOCUMENTS

| | | | |
|---|---|---|---|
| 2020/0086834 A1* | 3/2020 | Wolff | B60T 7/12 |
| 2021/0380089 A1 | 12/2021 | Dossi et al. | |
| 2022/0403902 A1* | 12/2022 | Kim | F16D 65/18 |
| 2023/0044940 A1* | 2/2023 | Kim | B60T 17/22 |

FOREIGN PATENT DOCUMENTS

| | | |
|---|---|---|
| JP | 2016-084035 A | 5/2016 |
| KR | 10-2019-0028008 A | 3/2019 |
| WO | 2016/079014 A1 | 5/2016 |

* cited by examiner

ELECTRO-MECHANICAL BRAKE

TECHNICAL FIELD

The present disclosure relates to an electro-mechanical brake. More particularly, the present disclosure relates to an electro-mechanical brake having a position sensor and a current sensor.

BACKGROUND

The content described in this section merely provides the background information on the present disclosure and does not constitute the prior art.

An Electro-Mechanical Brake (EMB) is being developed and widely used. The electro-mechanical brake was developed as an Electronic Parking Brake (EPB), but its using area is recently expanding to a main brake which substitutes for a conventional hydraulic brake. The EMB is a device in which an actuator driven by a motor is mounted on a brake caliper, so that a vehicle is directly braked by a motor driving force without a medium such as brake fluid. Since the EMB has a mechanism similar to that of the Electronic Parking Brake (EPB) but is mainly used for main braking unlike the EPB, the EMB requires higher braking response and operation durability than those of the EPB. Further, the electro-mechanical brake may be simpler in structure, be higher in braking response speed, and be more precisely controlled compared to a hydraulic brake, thereby improving braking stability.

The EMB uses a load sensor to generate a target braking force required by a driver. The EMB equipped with the load sensor may accurately measure a clamping force. However, if the EMB is equipped with the load sensor, the design of a component where the sensor is mounted becomes complicated, and manufacturing cost thereof increases. Furthermore, the size of the EMB due to the sensor mounting may be inevitably increased.

In order to prevent an increase in manufacturing cost and an increase in size of the EMB, the EMB may be designed such that the current flowing through a motor generating a braking force is measured using a current sensor instead of the load sensor, and then the clamping force is measured or estimated based on the measured current. However, a method of estimating the clamping force by measuring the current flowing through the motor is problematic in that a larger error occurs compared to the case of using the load sensor, so that it is difficult to accurately calculate a home position, i.e., a position at which a pressing unit contacts a friction load. Accordingly, it is difficult to secure stable braking performance of a vehicle.

SUMMARY

In view of the above, the present disclosure provides an electro-mechanical brake, which can more accurately calculate a home position based on two points, thus realizing stable braking performance of a vehicle.

The problems to be solved by the present disclosure are not limited to the above-mentioned problems, and other problems which are not mentioned will be clearly understood by those skilled in the art from the following description.

According to at least one embodiment, the present disclosure provides an electro-mechanical brake comprising: a brake disc; a friction pad configured to face the brake disc and press the brake disc; a pressing unit configured to press the friction pad toward the brake disc; a motor supplying power to the pressing unit so that the pressing unit presses the friction pad; a current sensor configured to measure an intensity (i) of current flowing through the motor; a position sensor configured to measure a position (d) of the pressing unit; and an initial position calculating unit calculating at least one of a home position or a contact point of the pressing unit, wherein the pressing unit is configured to pass through a first check point (C1) at which a first current (i1) is measured, and a second check point (C2) at which a second current (i2) greater than the first current is measured, and wherein the initial position calculating unit calculates at least one of the home position or the contact point based on the first current, the first check point, the second current, and the second check point.

According to another embodiment, the present disclosure provides a method of initializing a control of an electro-mechanical brake, the electro-mechanical brake comprising: a brake disc; a friction pad configured to face the brake disc and press the brake disc; a pressing unit configured to press the friction pad toward the brake disc; a motor supplying power to the pressing unit so that the pressing unit presses the friction pad; a current sensor configured to measure an intensity of current flowing through the motor; a position sensor configured to measure a position of the pressing unit; and an initial position calculating unit calculating at least one of a home position or a contact point of the pressing unit, the method comprising: a step in which the pressing unit moves in a direction for pressing the friction pad to a first check point where a first current is measured; a step in which the pressing unit moves, toward the brake disc, to a second check point where a second current greater than or equal to a reference current greater than the first current is measured; and a step of calculating at least one of the home position or the contact point based on the first current, the first check point, the second current, and the second check point.

As described above, an embodiment of the present disclosure provides an electro-mechanical brake, which can more accurately calculate a home position based on two points, thus realizing stable braking performance of a vehicle.

Figure 1:
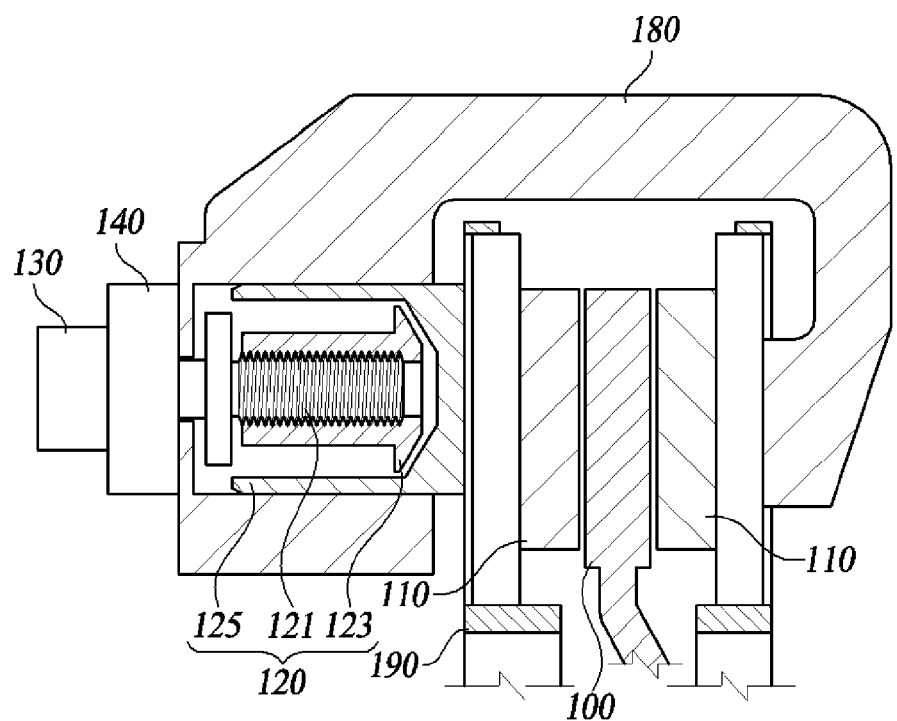
FIG. 1 is a sectional view showing an electro-mechanical brake.

| REFERENCEE NUMERIALS | |
|---|---|
| 100: brake disc | 110: friction pad |
| 120: pressing unit | 130: motor |
| h.p: home position | c.p: contact point |
| $C_1$: first check point | $C_2$: second check point |
| $C_3$: reference point | $d_1$: first distance |
| $d_2$: second distance | $i_1$: first current |
| $i_2$: second current | $P_1$: first position |
| $P_2$: second position | |

DETAILED DESCRIPTION

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a sectional view showing an electro-mechanical brake.

Referring to FIG. 1, the electro-mechanical brake according to an embodiment of the present disclosure includes a brake disc 100, a friction pad 110, a pressing unit 120, a motor 130, a current sensor (not shown), a position sensor (not shown), an initial position calculating unit (not shown).

The friction pad 110 is configured to face the brake disc 100 and press the brake disc 100. A pair of friction pads 110 may be installed on both sides of the brake disc 100 to be opposite to each other. At least a portion of the friction pad may be accommodated in a caliper housing 180 or a carrier 190 to guide the friction pad 110 such that the friction pad 110 moves perpendicularly to a side of the brake disc 100. The friction pad 110 installed such that at least a portion of the pad is accommodated in the carrier 190 may slide toward the brake disc 100 as a piston unit 125 presses the friction pad 110.

The pressing unit 120 is configured to press the friction pad 110 toward the brake disc 100. The clamping force applied to the friction pad 110 by the pressing unit 120 is sufficiently large, so that the actual displacement of the pressing unit 120 is very small and thus may not be measured. In the present disclosure, the pressing toward the brake disc 100 by the pressing unit 120 includes a case where the motor 130 rotates in the direction of increasing the clamping force applied to the brake disc 100.

The pressing unit 120 may include at least one of a gear, the pressing unit 120, or the piston unit 125.

Rotation power generated by the motor 130 is transmitted to the pressing unit 120 by one or more gears. The pressing unit 120 translates the friction pad 110 toward the brake disc 100. The gears are installed in a gearbox 140 adjacent to the brake disc 100. To be more specific, the pressing unit 120 may include a nut unit 123 and a bolt unit 121 installed in the caliper housing 160. When the bolt unit 121 is rotated by the gears, it engages with the nut unit 123 to perform a rectilinear motion. The piston unit 125 installed on the front of the nut unit 123 and pressed by the nut unit 123 comes into contact with the friction pad 110 to press the friction pad 110. However, the electro-mechanical brake of the present disclosure is not limited thereto. The electro-mechanical brake of the present disclosure includes various embodiments in which the piston unit 125 is the nut unit 123 itself, or the bolt unit 121 performs a translation motion and the nut unit 123 performs a rotary motion.

The motor 130 supplies power to the pressing unit 120 so that the pressing unit 120 presses the friction pad 110. A braking signal or a braking release signal is transmitted to the motor 130 because a stroke is applied to the pedal of the vehicle. The rotating force of the motor 130 is controlled in response to the braking signal or the braking release signal. The braking signal or the braking release signal may be generated by a driver's pedal stroke.

In the present disclosure, the position of the pressing unit 120 refers to the position of an end face of the friction pad 110 of the pressing unit 120. In an embodiment of the present disclosure, the position of the pressing unit 120 may mean the position of an end face of the friction pad 110 of the piston unit 125. In the present disclosure, the distance refers to a distance from a home position h.p which will be described below to the position of the pressing unit 120. In the present disclosure, a direction in which the pressing unit 120 moves toward the brake disc 100 is defined as a (+) direction.

The position sensor is configured to measure the position of the pressing unit 120. If the position of the pressing unit 120 is identified while factors such as the wear of the friction pad 110 are not considered, the position of the end face facing the brake disc 100 of the friction pad 110 produced to have a certain specification may be roughly estimated.

Figure 2:
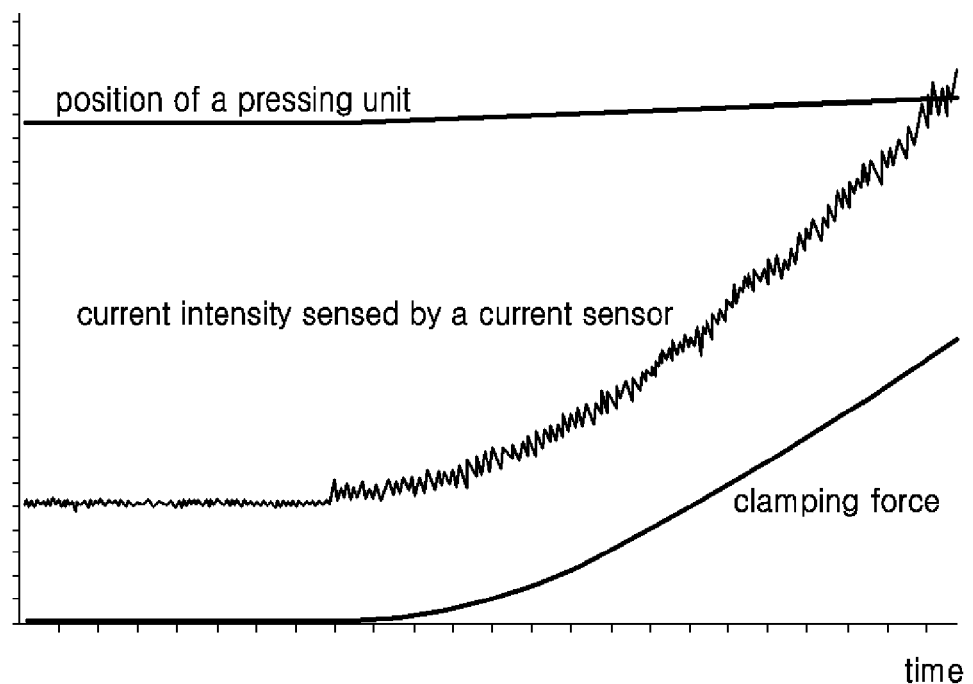
FIG. 2 is a graph showing the position of a pressing unit, a current and a clamping force according to time.

FIG. 2 is a graph showing the position of the pressing unit 120, a current and a lamping force according to time.

Figure 3:
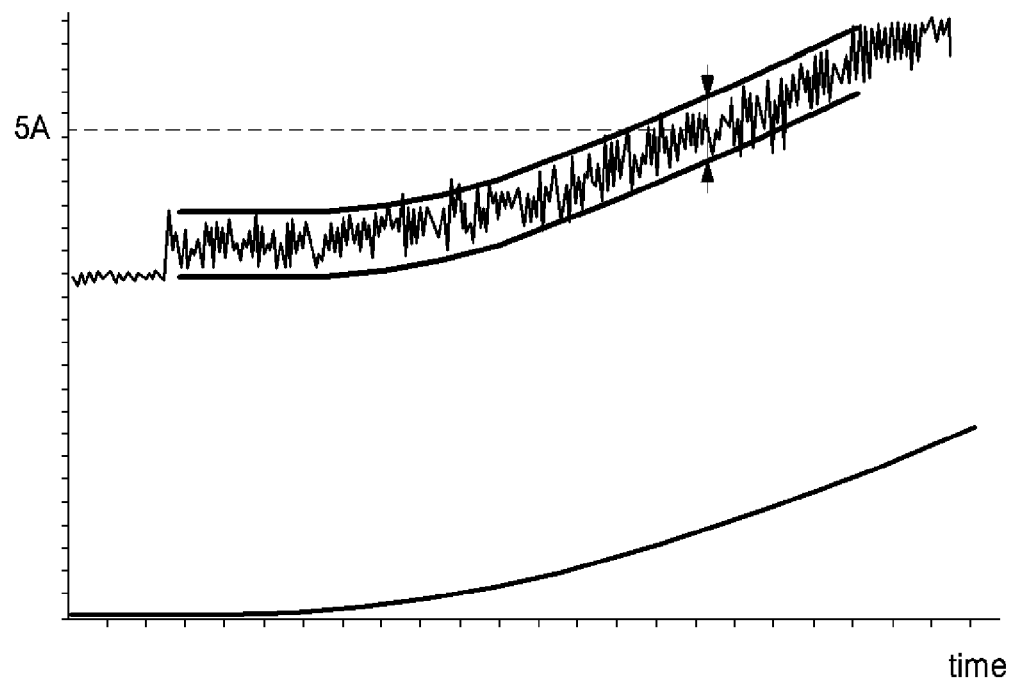
FIG. 3 is a graph showing a current and a clamping force according to time.

FIG. 3 is a graph showing a current and a clamping force according to time.

Referring to FIGS. 1 to 3, the pressing unit 120 of the electro-mechanical brake presses the friction pad 110 to generate the braking force. Here, a force by which the pressing unit 120 presses the friction pad 110 is defined as a clamping force. The clamping force is approximately proportional to the intensity of the current measured by the current sensor, which will be described later.

Since the pressing unit 120 does not contact and press the friction pad 110, the friction pad 110 may be spaced apart from the brake disc 100. In this case, the clamping force is not generated regardless of the movement of the pressing unit 120.

A distance at which the pressing unit 120 starts to contact the friction pad 110 is referred to as a contact point c.p. Furthermore, a point at which the pressing unit 120 is spaced by a slight distance from the contact point c.p in a pressing release direction and the clamping force is not generated is referred to as a home position h.p. The slight distance may have the value of about 0.1 mm to 0.3 mm according to a material specification of a friction material.

As the pressing unit 120 moves from the contact point c.p toward the brake disc 100, the force of the friction pad 110 pressing the brake disc 100 is increased. A pair of friction pads 110 disposed on both sides of the brake disc 100 may constrain the rotation of a wheel by pressing both sides of the brake disc 100.

When the distance of the pressing unit 120 is close to the home position h.p, the stiffness of the friction pad 110 in a distance-current relationship does not play a dominant role in the intensity of the current, that is, the magnitude of the clamping force. Thus, when the distance of the pressing unit 120 is close to the home position h.p, the distance-current graph is drawn non-linearly. However, as the distance of the pressing unit 120 increases, the stiffness of the friction pad 110 becomes a dominant variable in the magnitude of the clamping force, so that the distance-current approaches a linear relationship.

Figure 4:
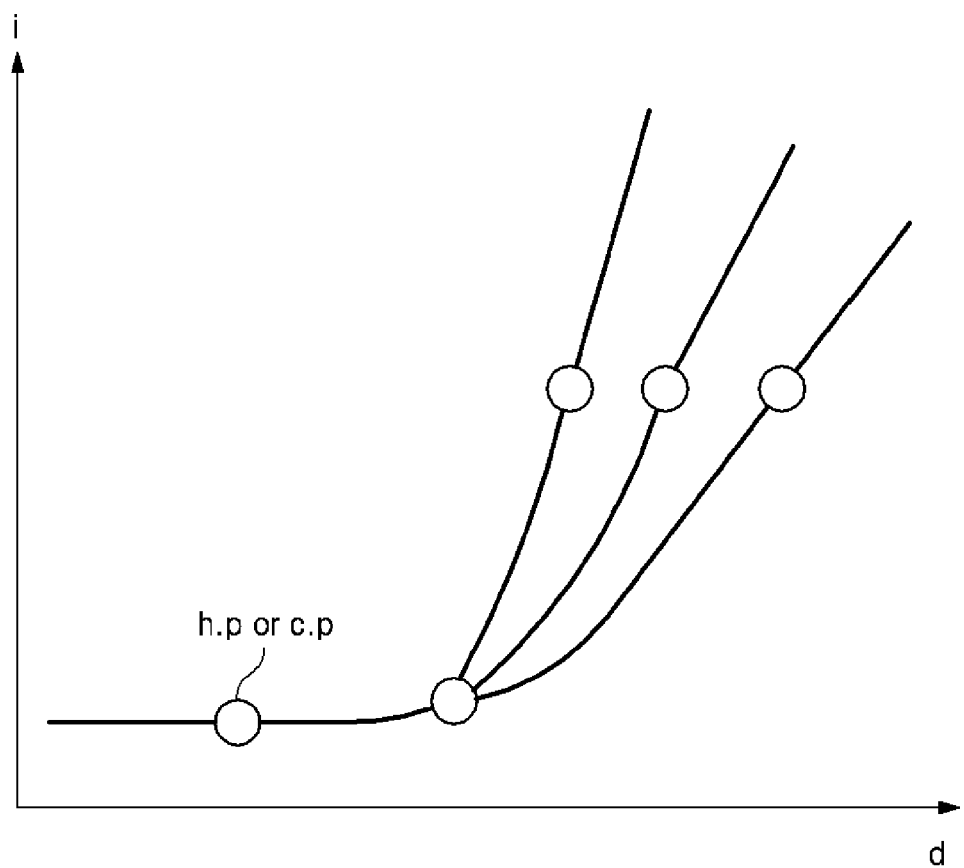
FIG. 4 shows a distance-current graph in each case in which the efficiency of an electro-mechanical brake is different.

FIG. 4 shows a distance-current graph in each case in which the efficiency of an electro-mechanical brake is different.

Figure 5:
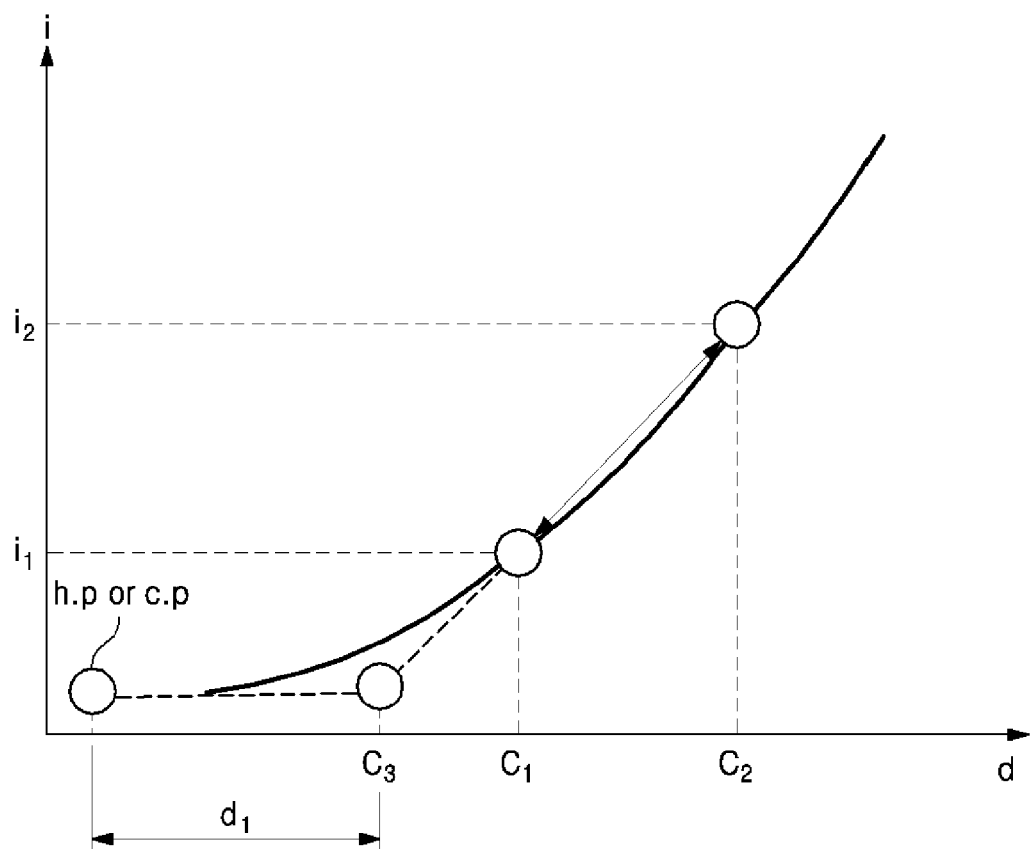
FIG. 5 is a distance-current graph for explaining an initial position calculating method according to an embodiment of the present disclosure.

FIG. 5 is a distance-current graph for explaining an initial position calculating method according to an embodiment of the present disclosure.

Referring to FIGS. 4 and 5, when the distance is close to zero (0), the distance and the current have a non-linear relationship. As the distance increases, the distance and the current become closer to a linear relationship. In the present disclosure, a section in which the distance is small and the distance and the current have the non-linear relationship is referred to as a non-linear section, while a section having a larger distance is referred to as a linear section. Since the distance and the clamping force approximately have the linear relationship in the linear section, it is possible to relatively accurately estimate the clamping force using the position sensor. However, it is difficult to estimate the contact point c.p or the home position h.p between the brake disc 100 and the friction pad 110 only with the position sensor. The contact point c.p or the home position h.p should be detected not using the position sensor but using a current sensor which will be described below.

The current sensor is configured to measure the intensity of the current driving the motor 130. The intensity of the current measured by the current sensor is approximately proportional to the clamping force. Therefore, it is possible to estimate the clamping force of the electro-mechanical brake using the intensity of the current measured by the current sensor. The current sensor may not be newly installed to implement the electro-mechanical brake of the present disclosure, but may use a current sensor installed in the motor 130 of an existing electro-mechanical brake.

Referring to FIG. 3, since the current sensor is low in resolution and is large in the noise of a measurement current, it is difficult to accurately detect the position of the contact point c.p. For example, if it is determined that a point at which the current intensity of 5 A is detected is the contact point c.p, it is difficult to accurately determine which point is the contact point c.p when the current intensity is detected as shown in FIG. 3.

The position of the pressing unit 120 produced by subtracting a predetermined distance, which is experimentally determined, from the position of the pressing unit 120 in which a predetermined current intensity is detected may be estimated as the contact point c.p. This is to overcome the low precision of the current sensor. Hereinafter, in the present disclosure, the above-described method is referred to as a method using one point.

The method using one point is effective when the relationship between the current intensity measured by the current sensor and the clamping force is constant. However, the efficiency at which electric power driving the motor 130 is converted into the clamping force may vary. This may be caused by environmental factors such as impurities caught between the friction pads 110 or a change in temperature of the friction pad 110, or abrasion due to repeated operation of the disc brake or a change in temperature.

FIG. 4 shows a distance-current graph when efficiencies at which the electric power for driving the motor 130 is converted into the clamping force are different.

Referring to FIG. 4, when efficiencies at which the electric power for driving the motor 130 is converted into the clamping force are different, an accurate contact point c.p may not be calculated by the above-described method. In this case, a method of using one point may lead to inaccurate results. If an accurate contact point c.p may not be calculated, the distance-current graph may also become inaccurate.

On the other hand, in the electro-mechanical brake according to an embodiment of the present disclosure, a point moved by a certain distance from one point on the distance-current graph is not determined as the contact point c.p.

The pressing unit 120 of the present disclosure is configured to pass from a first check point C1 at which a first current i1 is measured through a second check point C2 at which a second current i2 is measured. Thus, the home position h.p or the contact point c.p is calculated based on the two points.

The initial position calculating unit of the apparatus according to an exemplary embodiment of the present disclosure may be a processor (e.g., computer, microprocessor, CPU, ASIC, circuitry, logic circuits, etc.). The initial position calculating unit may be implemented by a non-transitory memory storing, e.g., a program(s), software instructions reproducing algorithms, etc., which, when executed, performs various calculating functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The initial position calculating unit according to an embodiment of the present disclosure calculates at least one of the home position h.p or the contact point c.p of the pressing unit 120. To be more specific, the initial position calculating unit calculates the home position h.p or the contact point c.p based on the first current i1, the first check point C1, the second current i2, and the second check point C2.

When the position of the pressing unit 120 is changed from the first check point C1 to the second check point C2, the initial position calculating unit according to an embodiment of the present disclosure calculates a reference point C3 based on an amount of change in current and calculates at least one of the home position h.p or the contact point c.p based on the reference point C3. That is, the reference point is calculated based on a gradient from point (C1, i1) to point (C2, i2) on the distance-current graph.

For example, referring to FIG. 5, the initial position calculating unit calculates the reference point C3 satisfying Equation 1 or Equation 2.

$$c_3 = -i_1 \times \frac{c_2 - c_1}{i_2 - i_1} + c_1 \qquad \text{[Equation 1]}$$

$$c_3 = -i_2 \times \frac{c_2 - c_1}{i_2 - i_1} + c_2 \qquad \text{[Equation 2]}$$

The position of the pressing unit at a point where a straight line connecting two points on the distance-current graph meets a distance axis is taken as the reference point.

At least one of the home position h.p or the contact point c.p are calculated based on the reference point C3. The initial position calculating unit according to an embodiment of the present disclosure calculates a position at which the pressing unit 120 moves away from the brake disc 100 by the first distance d1 from the reference point C3, as the home position h.p or the contact point c.p.

For example, the home position h.p or the contact point c.p is calculated by Equation 3.

$$h.p \text{ or } c.p = c_3 - d_1 \quad \text{[Equation 3]}$$

Referring to FIGS. 4 and 5, the electro-mechanical brake according to an embodiment of the present disclosure may accurately calculate the home position h.p or the contact point c.p, even if the efficiency of converting the electric power driving the motor 130 into the clamping force varies due to the repeated operation of the electro-mechanical brake or environmental factors. In order to more accurately calculate the home position h.p or the contact point c.p, a pair of points which are spaced apart from each other by a predetermined distance or more may be detected multiple times, and an average gradient connecting respective pairs of points may be used. The initial position calculating unit may be a logic or circuit included in a control unit installed in an existing vehicle rather than a new component added to the existing vehicle.

The initial position calculating unit according to an embodiment of the present disclosure calculates the position at which the pressing unit 120 moves away from the brake disk 100 by the first distance d1 from the reference position C3 as the home position h.p or the contact point c.p.

The first distance d1 may be a value which varies depending on the magnitude of the clamping force for the electric power driving the motor 130 or the temperature of the friction pad 110. Thus, the first distance d1 according to an embodiment of the present disclosure is determined based on at least one of efficiency at which the electric power applied to the motor 130 is converted into the clamping force and the wear amount of the friction pad 110. Thus, the initial position calculating unit according to an embodiment of the present disclosure may accurately calculate at least one of the home position h.p and the contact point c.p even if the magnitude of the clamping force for the electric power of the motor 130 or the temperature of the friction pad 110 varies. However, the present disclosure is not limited thereto, and the first distance d1 may be preset through one or more experiments. The preset first distance d1 may be configured as, for example, a table value which varies according to the above efficiency.

Figure 6:
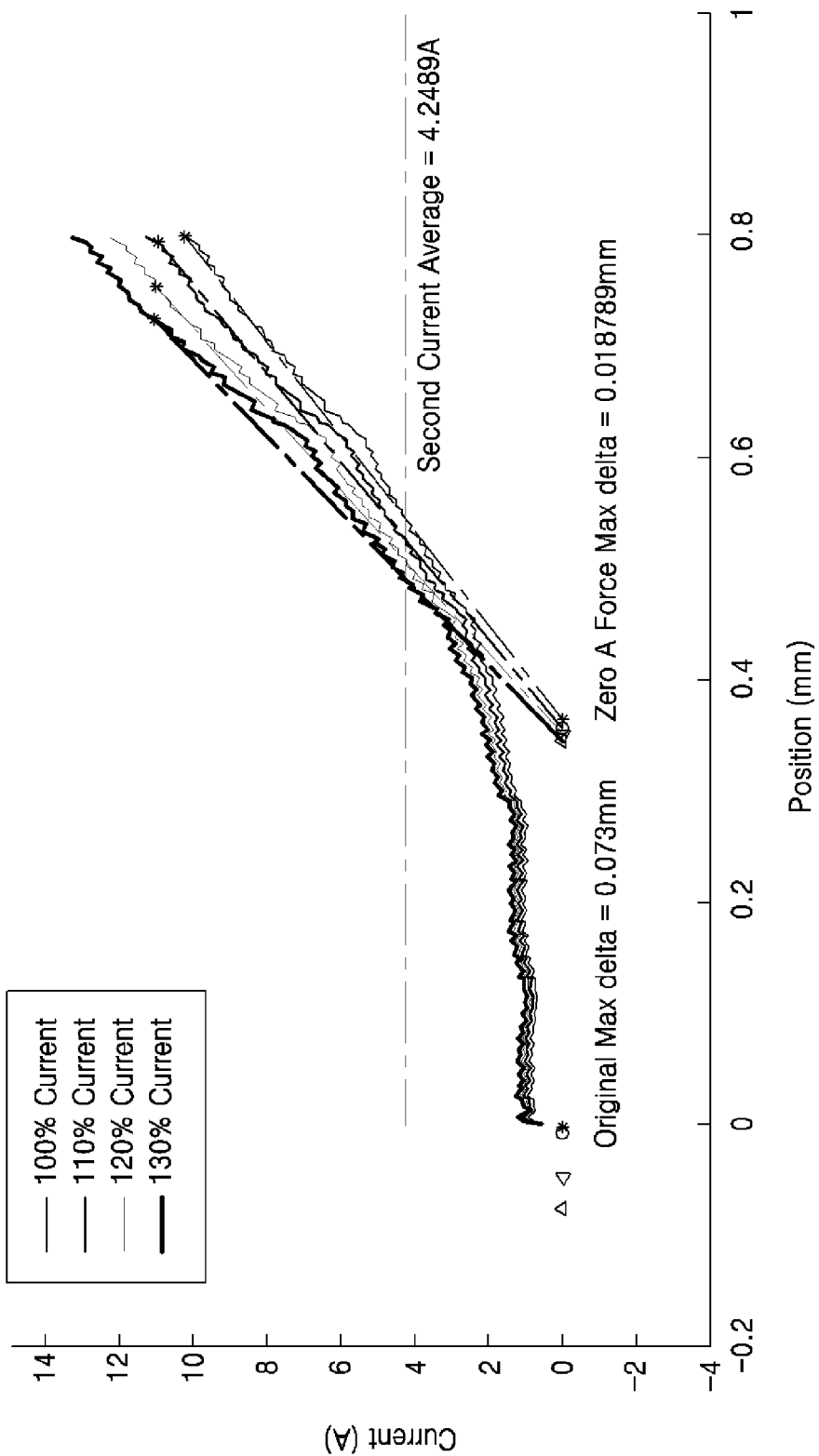
FIG. 6 shows a distance-current graph of an electro-mechanical brake according to an embodiment of the present disclosure.

FIG. 6 shows a distance-current graph of an electro-mechanical brake according to an embodiment of the present disclosure.

When comparing FIGS. 4 and 6, the electric brake according to an embodiment of the present disclosure calculates the home position h.p using two points on the distance-current graph. Thus, in the electro-mechanical brake according to an embodiment of the present disclosure, it is possible to calculate the home position h.p with very high accuracy even if the magnitude of the clamping force for the electric power driving the motor is changed.

The first check position is closer to the brake disk than a predetermined first position P1, while the second check point is closer to the brake disk than a predetermined second position P2.

Referring to the graphs shown in FIGS. 4 and 5, it is easy to accurately calculate the home position h.p or the contact point c.p as the first check point C1 and the second check point C2 deviate from the non-linear section of the distance-current graph. The first position P1 and the second position P2 have values such that the first check point C1 and the second check point C2 are positioned in the linear section of the distance-current graph.

The first check point C1 and the second check point C2 according to an embodiment of the present disclosure are spaced apart from each other by a predetermined distance. Referring to the graphs shown in FIGS. 4 and 5, if a distance between the first check point C1 and the second check point C2 is narrow, particularly if the first check point C1 and the second check point C2 are positioned close to the non-linear section, the deviation of the calculated home position h.p may increase depending on the surrounding environment or the efficiency at which the electric power of the motor is converted into clamping force. On the contrary, it is possible to relatively accurately calculate the home position h.p or the contact point c.p by increasing the distance between the first check point C1 and the second check point C2.

In the electro-mechanical brake according to an embodiment of the present disclosure, a position where the pressing unit 120 moves from the contact point c.p by the second distance d2 in the pressing release direction is the home position h.p. As described above, a point where the pressing unit 120 starts to contact the friction pad 110 is referred to as the contact point c.p. Further, a point at which the pressing unit 120 is separated from the contact point c.p by the second distance d2 to the opposite side of the friction pad 110 and the clamping force is not generated is referred to as the home position h.p. In this case, the second distance d2 may have the value of about 0.1 mm to 0.3 mm according to a material specification of a friction material. The initial position calculating unit according to an embodiment of the present disclosure may calculate the contact point c.p, thereby calculating the home position h.p spaced apart from the contact point c.p toward the opposite side of the friction pad 110 by a predetermined distance. In contrast, this may calculate the home position h.p, thereby calculating the contact point c.p spaced apart from the home position h.p toward the friction pad 110 by a predetermined distance.

Here, the first distance d1 and the second distance d2 may be determined by an experiment. The experiment may be performed multiple times to more accurately determine the home position h.p or the contact point c.p.

A method of initializing a control of an electro-mechanical brake according to an embodiment of the present disclosure may be performed by the above-described electro-mechanical brake.

Figure 7:
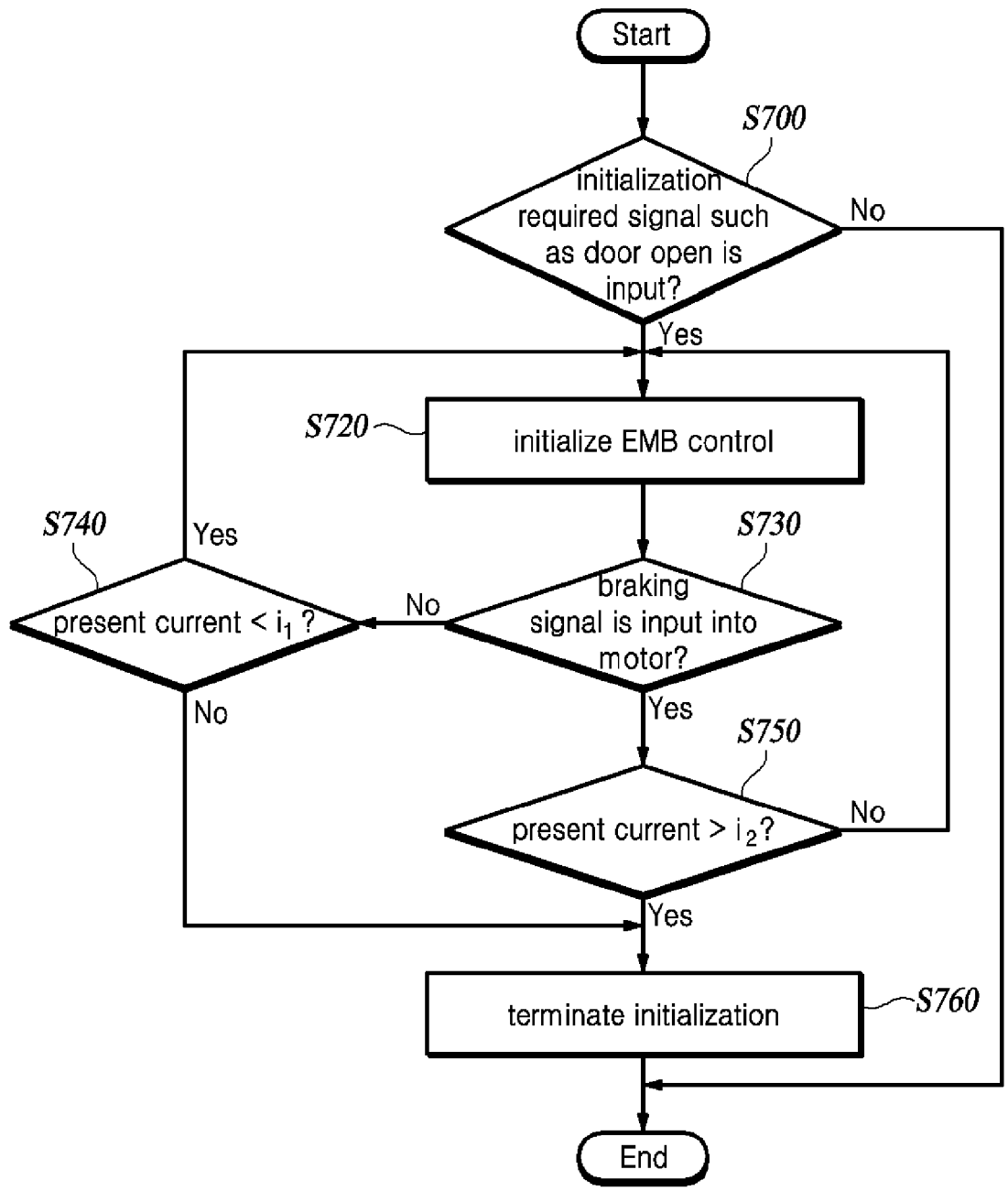
FIG. 7 is a flowchart showing a method of initializing the control of an electro-mechanical brake according to an embodiment of the present disclosure.

FIG. 7 is a flowchart showing a method of initializing the control of an electro-mechanical brake according to an embodiment of the present disclosure.

Referring to FIG. 7, the method of initializing the control of the electro-mechanical brake according to an embodiment of the present disclosure includes at least one of a step S710 of inputting an electro-mechanical brake control initialization signal, a step S720 of initializing the control of the electro-mechanical brake, a step S730 of inputting a braking signal into the motor 130, a step S740 of determining whether a present current is smaller than the first current i1, a step S750 of determining whether a present current is larger than the second current i2, and a step S770 of terminating the electro-mechanical brake control initialization.

In step S710, a control initialization signal of reconstructing the distance-current graph is input into the electro-mechanical brake by opening a vehicle door, for example. In the case of inputting the electro-mechanical brake control initialization signal, the step S720 is performed. The step S720 will be described below in detail.

In step S730, a braking signal may be generated due to a driver's pedal stroke. When the braking signal is not input into the motor 130 in step S730, the step S740 is performed. On the other hand, in the case of inputting the braking signal into the motor 130, the step S750 is performed.

If the present current is greater than the reference current in step S740, the initialization of the electro-mechanical brake control is terminated. On the other hand, when the present current is smaller than the reference current, the process returns to the step S720.

That is, in the case of inputting the braking signal into the motor 130 before reaching the reference current, the second current i2 is the reference current. After the pressing unit 120 moves towards the friction pad 110 to reach the reference current, the braking signal may be input. In this case, a current value when the braking signal is input is set as the second reference current. For example, if the brake pedal signal is received before reaching the reference current, the pedal signal is ignored and the pressing unit 120 is moved in the pressing direction until the reference current is reached. If the pedal signal is input while the intensity of the current passes through the reference current and is directed to the second current i2 which is a recommended value, the current when the pedal signal is input is set as the second current i2 and the control initialization is terminated. In addition, after the brake pedal signal reaches the recommended second current i2, the braking signal may be input before the braking force generated for initialization is completely released. In this case, since the initialization has already been completed, the braking force is generated according to the input pedal signal. If the pedal signal is not received after reaching the recommended second current i2, the process waits for the pedal signal while maintaining a state in which the initialization has been terminated.

Figure 8:
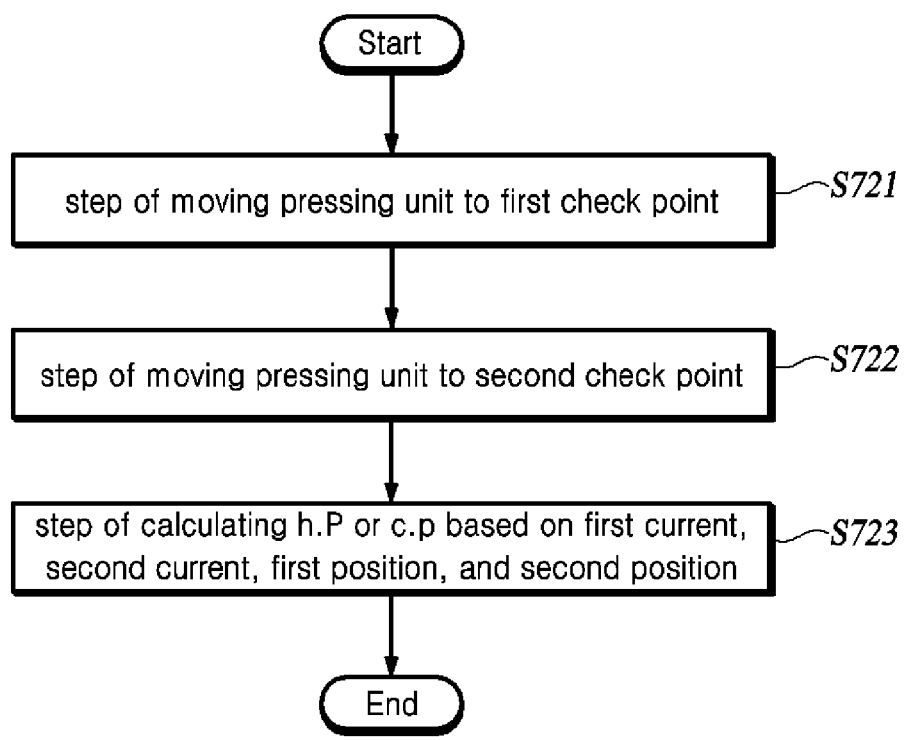
FIG. 8 is a flowchart showing a process of initializing the control of an electro-mechanical brake according to the present disclosure.

FIG. 8 is a flowchart showing a process of initializing the control of the electro-mechanical brake according to the present disclosure.

Referring to FIG. 8, the step S720 includes a step S721 in which the pressing unit 120 moves to press the friction pad 110 to the first check point C1 at which a first current i1 is measured, a step S722 in which the pressing unit 120 moves to press the friction pad 110 to the second check point C2 at which the second current i2 greater than or equal to the reference current greater than the first current i1 is measured, and a step S723 of calculating at least one of the home position h.p or the contact point c.p based on the first current i1, the first check point C1, the second current i2, and the second check point C2.

The step S720 according to an embodiment of the present disclosure is performed within a predetermined time after the control initialization signal is input. For example, this is performed within one second after the vehicle door is opened. This is to prolong the process of initializing the control of the electro-mechanical brake, thereby preventing a driver from feeling that the vehicle is braked against his or her will.

The step S723 according to an embodiment of the present disclosure includes a step of calculating the reference position C3 based on the amount of change in current when the position of the pressing unit 120 changes from the first check point C1 to the second check point C2, and a step of calculating at least one of the home position h.p or the contact point c.p based on the reference point.

For example, the step of calculating at least one of the home position or the contact point may be expressed as Equation 4 or Equation 5.

$$c_3 = -i_1 \times \frac{c_2 - c_1}{i_2 - i_1} + c_1 \quad \text{[Equation 4]}$$

or $$c_3 = -i_2 \times \frac{c_2 - c_1}{i_2 - i_1} + c_2 \quad \text{[Equation 5]}$$

The method may include a step in which the reference point C3 satisfying the above Equation is calculated and at least one of the home position or the contact point are calculated based on the reference point.

The step S723 according to an embodiment of the present disclosure may include a step of subtracting the first distance d1 from the reference point C3. Alternatively, an embodiment of the present disclosure may further include a step of performing an experiment to determine the first distance d1.

Although exemplary embodiments of the present disclosure have been described for illustrative purposes, those skilled in the art will appreciate that various modifications, additions, and substitutions are possible, without departing from the idea and scope of the present disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the present disclosure is not to be limited by the above explicitly described embodiments but by the claims and equivalents thereof.

What is claimed is:

1. An electro-mechanical brake comprising:
   a brake disc;
   a friction pad configured to face the brake disc and press the brake disc;
   a pressing unit configured to press the friction pad toward the brake disc;
   a motor supplying power to the pressing unit so that the pressing unit presses the friction pad;
   a current sensor configured to measure an intensity of current flowing through the motor;
   a position sensor configured to measure a position of the pressing unit; and
   an initial position calculating unit calculating at least one of a home position or a contact point of the pressing unit,
   wherein the pressing unit is configured to pass through a first check point at which a first current is measured, and a second check point at which a second current greater than the first current is measured,
   wherein the initial position calculating unit calculates at least one of the home position or the contact point based on the first current, the first check point, the second current, and the second check point,
   wherein the initial position calculating unit calculates a reference point based on an amount of change in current when a position of the pressing unit is changed from the first check point to the second check point, and calculates at least one of the home position or the contact point, based on the reference point, and
   wherein the initial position calculating unit calculates at least one of the home position or the contact point, based on a position where the pressing unit moves away from the brake disc by a first distance from the reference point.

2. The electro-mechanical brake of claim 1, wherein the first distance is determined based on at least one of efficiency at which electric power applied to the motor is converted into a clamping force or a wear amount of the friction pad.

3. The electro-mechanical brake of claim 1, wherein the first check point is closer to the brake disc than a predetermined first position, and the second check point is closer to the brake disc than a predetermined second position.

4. The electro-mechanical brake of claim 1, wherein the first check point and the second check point are spaced apart from each other by a predetermined distance.

5. The electro-mechanical brake of claim 1, wherein, while the pressing unit moves from the first check point to the second check point, the pressing unit moves only toward the brake disc.

6. A method of initializing a control of an electro-mechanical brake, the electro-mechanical brake comprising:
   a brake disc;
   a friction pad configured to face the brake disc and press the brake disc;
   a pressing unit configured to press the friction pad toward the brake disc;
   a motor supplying power to the pressing unit so that the pressing unit presses the friction pad;
   a current sensor configured to measure an intensity of current flowing through the motor;
   a position sensor configured to measure a position of the pressing unit; and
   an initial position calculating unit calculating at least one of a home position and a contact point of the pressing unit, the method comprising:
   a step in which the pressing unit moves in a direction for pressing the friction pad to a first check point where a first current is measured;
   a step in which the pressing unit moves, toward the brake disc, to a second check point where a second current greater than or equal to a reference current greater than the first current is measured; and
   a step of calculating at least one of the home position and the contact point based on the first current, the first check point, the second current, and the second check point,
   wherein the step of calculating at least one of the home position and the contact point comprises:
   a step of calculating a reference point based on an amount of change in current when a position of the pressing unit is changed from the first check point to the second check point;
   a step of calculating at least one of the home position and the contact point based on the reference point; and
   a step of subtracting a first distance from the reference point.

7. The method of claim 6, wherein the method of initializing the control of the electro-mechanical brake is performed within a predetermined time after a control initialization signal is input.

8. The method of claim 6, wherein, when a braking signal is input into the motor before reaching the reference current, the second current is set to the reference current.

9. The method of any one of claim 8, wherein the braking signal is generated by a driver's pedal stroke.

10. A method of initializing a control of an electro-mechanical brake, the electro-mechanical brake comprising:
    a brake disc;
    a friction pad configured to face the brake disc and press the brake disc;
    a pressing unit configured to press the friction pad toward the brake disc;
    a motor supplying power to the pressing unit so that the pressing unit presses the friction pad;
    a current sensor configured to measure an intensity of current flowing through the motor;
    a position sensor configured to measure a position of the pressing unit; and
    an initial position calculating unit calculating at least one of a home position and a contact point of the pressing unit, the method comprising:
    a step in which the pressing unit moves in a direction for pressing the friction pad to a first check point where a first current is measured;
    a step in which the pressing unit moves, toward the brake disc, to a second check point where a second current greater than or equal to a reference current greater than the first current is measured; and
    a step of calculating at least one of the home position and the contact point based on the first current, the first check point, the second current, and the second check point,
    wherein, when a braking signal is input after the pressing unit moves toward the brake disc and reaches the reference current, a current value when the braking signal is input is set to the second current.

11. The method of any one of claim 10, wherein the braking signal is generated by a driver's pedal stroke.

* * * * *